United States Patent
Baylot

(10) Patent No.: US 7,011,244 B2
(45) Date of Patent: Mar. 14, 2006

(54) CENTERING INSERT AND A METHOD OF ASSEMBLING AND WELDING TOGETHER TWO PIPE ELEMENTS

(75) Inventor: Michel Baylot, Marseille (FR)

(73) Assignee: Saipem S.A., Montigny le Bretanneux (FR)

( * ) Notice: Subject to any disclaimer, the term of this patent is extended or adjusted under 35 U.S.C. 154(b) by 229 days.

(21) Appl. No.: 10/450,541

(22) PCT Filed: Dec. 21, 2001

(86) PCT No.: PCT/FR01/04175

§ 371 (c)(1),
(2), (4) Date: Jun. 13, 2003

(87) PCT Pub. No.: WO02/49799

PCT Pub. Date: Jun. 27, 2002

(65) Prior Publication Data

US 2004/0031840 A1 Feb. 19, 2004

(30) Foreign Application Priority Data

Dec. 21, 2000 (FR) .......................................... 00 16746

(51) Int. Cl.
B23K 9/32 (2006.01)

(52) U.S. Cl. ..................................... 228/114; 228/44.3
(58) Field of Classification Search ................. 228/114, 228/212, 213, 49.3, 44.3, 44.5; 219/61.1
See application file for complete search history.

(56) References Cited

U.S. PATENT DOCUMENTS

| | | | |
|---|---|---|---|
| 3,896,655 A | | 7/1975 | Watson |
| 4,060,190 A | * | 11/1977 | Paolini ........................ 228/2.3 |
| 4,201,326 A | * | 5/1980 | Connell ........................ 228/50 |
| 4,306,134 A | | 12/1981 | Slavens et al. |
| 4,418,860 A | | 12/1983 | LaForce |
| 4,463,938 A | | 8/1984 | Dearman |
| 5,110,031 A | * | 5/1992 | Rinaldi ........................ 228/50 |
| 5,356,067 A | * | 10/1994 | Leduc ........................ 228/44.5 |
| 5,535,938 A | * | 7/1996 | Leduc ........................ 228/212 |
| 6,119,916 A | * | 9/2000 | Anderson et al. .......... 228/44.5 |
| 6,262,403 B1 | * | 7/2001 | Tsuchiya et al. ............ 219/607 |
| 6,637,640 B1 | * | 10/2003 | Sennett ........................ 228/44.3 |

* cited by examiner

*Primary Examiner*—Jonathan Johnson
(74) *Attorney, Agent, or Firm*—Cohen, Pontani, Lieberman & Pavane

(57) ABSTRACT

A centering insert device for centering two pipe elements that are to be welded together end to end, the device comprising a central body supporting a plurality of clamps. The clamps located at the center section planes have a circular conforming effect in at least one pair of central section planes of the two pipe elements. The clamps placed in at least one pair of end planes of the two pipe elements are adapted to become blocked against the inside walls of the pipe elements without deforming them, freezing the shape of the pipe elements in their initial state, i.e., their shape prior to the end clamps being actuated to come into abutment against the walls.

20 Claims, 5 Drawing Sheets

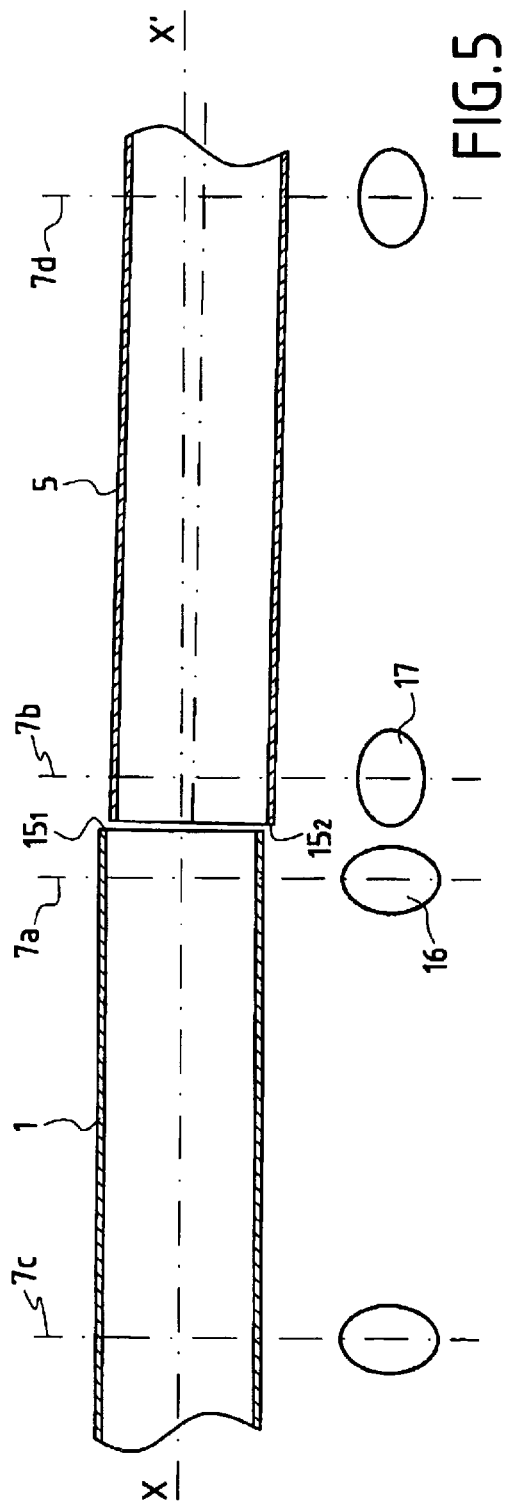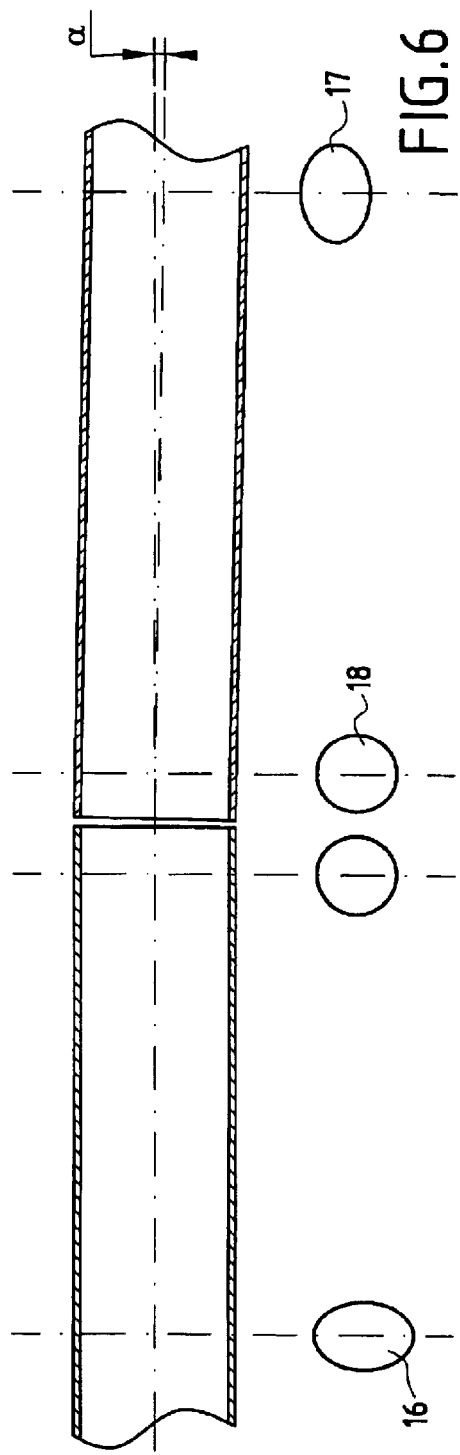

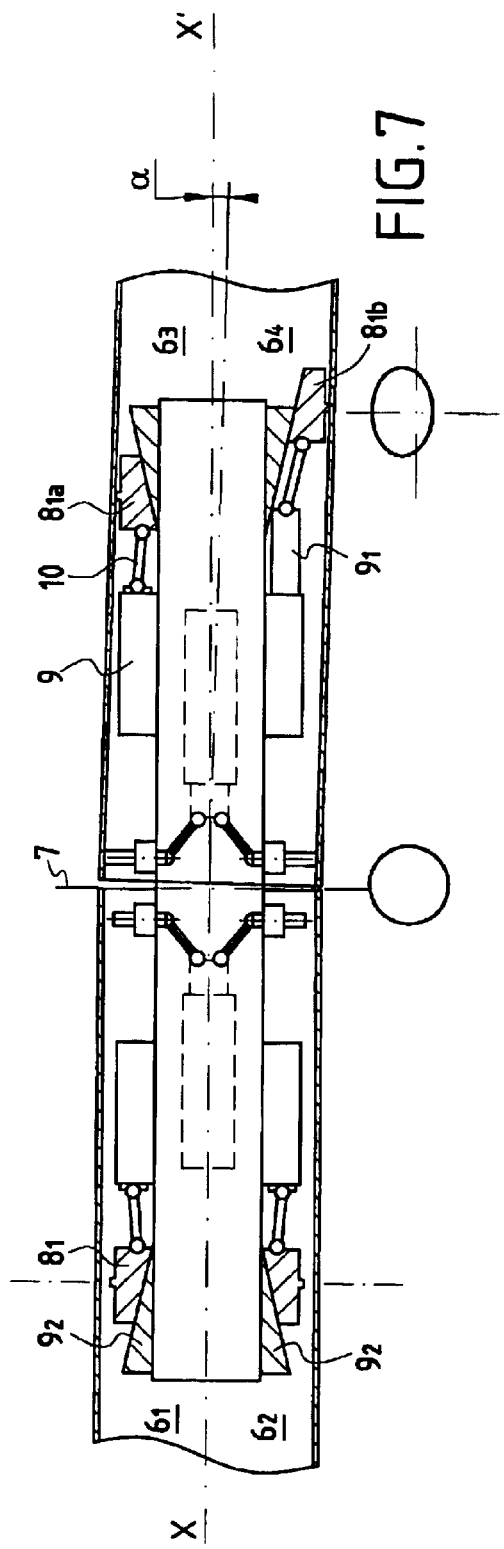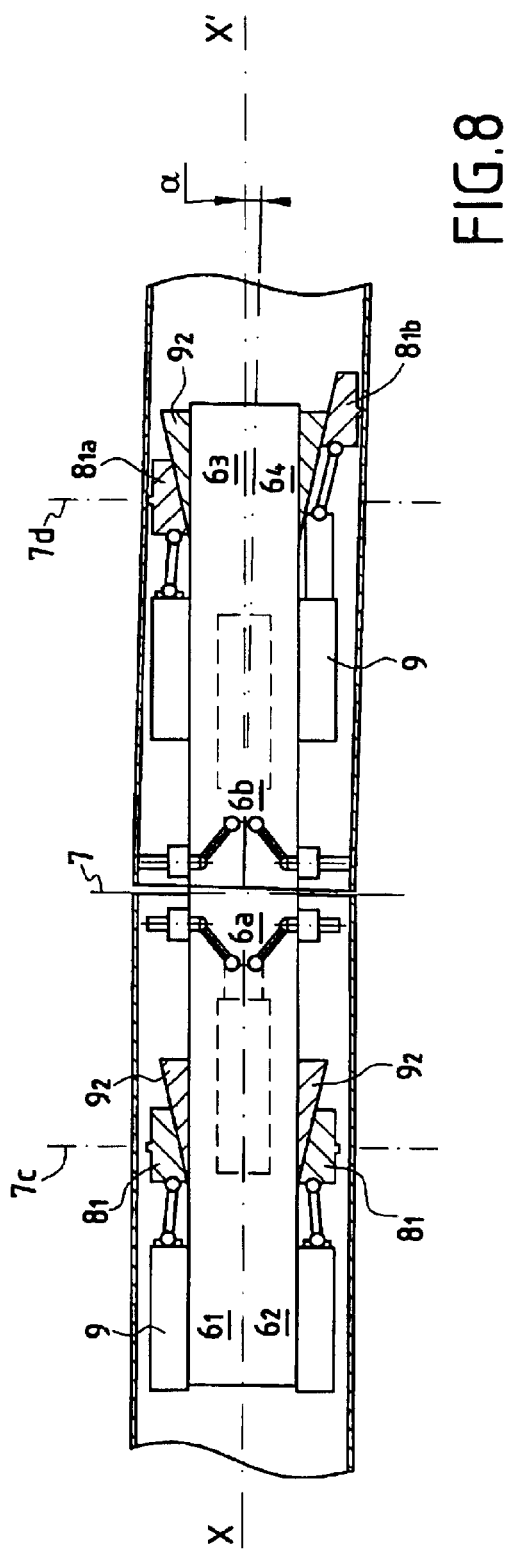

CENTERING INSERT AND A METHOD OF ASSEMBLING AND WELDING TOGETHER TWO PIPE ELEMENTS

This is a U.S. national stage of application No. PCT/FR01/04175, filed on Dec. 21, 2001. Priority is claimed on that application and on French Patent Application No.: 00/16746, Filed: Dec. 21, 2000.

FIELD OF THE INVENTION

The present invention relates to an insert device for centering two pipe elements that are to be joined together end to end by welding, the insert being suitable for inserting inside said pipe element in register with said pipe elements that are to be welded together, preferably centered on their junction plane.

The present invention also provides a method of assembling and welding together two pipe elements using a centering insert device of the invention.

The present invention thus relates to holding two pipe elements in position during the operations of joining them together end to end by welding.

The invention relates in particular to welding together two elements of undersea pipe on board installation ships or barges, by the so-called "S" or "J" method, mainly when the depth of water is great.

The invention applies in particular to laying a pipe made up of rectilinear segments or "n-bles" which are assembled together by welding and laid one after another, each segment itself possibly being built up of a plurality of unit lengths of pipe assembled together by welding to constitute a double, a "thribble", or a "fourble", for example.

BACKGROUND OF THE INVENTION

When pipes are laid undersea in shallow and medium depths, they are laid from floating supports fitted with handling means by assembling together unit lengths of tube that are generally 12 meters (m) or 24 m long. These lengths are handled while in the horizontal position and they are supplied to an assembly line where they are joined together end to end to form a continuous pipe which is displaced, generally in steps of 12 m or 24 m towards the stern of the barge. In the zone where it leaves the barge, the pipe is supported by a semi-floating structure of controlled curvature referred to as a "stinger" whose function is to limit the curvature of the pipe so as to prevent it from kinking. The new unit length is docked to the pipe that has already been made in the forward zone of the barge, at the first assembly station. This does not present great difficulty since the pipe resting on carriages or rollers can be maintained in extremely rigid manner, with welding then being performed on two parts that are almost perfectly stationary relative to each other, even in the event of the barge moving considerably because it is subjected to sea conditions.

In greater depths, and particularly for depths exceeding 1000 m or even 2000 m or more, laying is implemented in the so-called "J" configuration since the portion of pipe between the level of the ship and its point of contact on the sea bed takes up a J-shape. Such J-laying is described in particular in French patent applications Nos. 99/05534 and 99/11584. During laying, connecting together successive portions of pipe requires the portion of pipe that is already in the water to be kept stable, requires the top end of said portion of pipe which is above the water to be presented to the bottom end of the new portion of pipe, and requires the two ends of the pipe elements that are to be welded together to be held firmly together so that welding can be performed without risk of damage due to the various movements of the ship and of the portion of pipe that has already been made and that is suspended down to the bottom of the sea. The damage that is to be feared is constituted mainly by microcracking during the welding process which at best will lead to the weld being rejected during quality control, and as worst will lead to a break with the entire assembly then being lost while an installation is being put into service.

During such J-laying, the difficulty lies in the fact that all of the operations are performed at a single location, generally situated on the deck of the ship, and thus close to the bottom end of the tower, and in addition all of the operations need to be performed as quickly as possible because of the extremely high cost per hour of an installation ship.

The pipe that has already been made is held in suspension in the bottom portion of the tower and is guided at the bottom of said J-laying tower, being held securely by a system of external clamps over a length which cannot exceed several meters at most, for example as described in French patent application No. 99/14525. The portion of the pipe that is underwater is then subjected to bending which is transferred to its portion out of the water, whereas in contrast the new length of pipe or segment which generally measures 24 m to 48 m can be held securely within the J-laying tower. As a result, during movement of the ship due to the effects of swell, wind, and currents, the portion of pipe that has already been made and that is in suspension constitutes the least rigid portion in the zone close to the welding plane, in spite of being held very securely in the bottom portion of said tower.

When performing S-laying on a barge, it is general practice to use a centering insert fitted with pneumatic means for centering the two pipe portions. The centering insert is constituted by a system of internal clamps enabling the ends of the pipes that are to be welded end to end to be held facing each other and to cause their respective axes to coincide. In addition, when the thickness of the pipes is not too great, the forces generated against the wall by the clamps, more precisely by the pushers against the wall, have a tendency to return pipes that have become ovalized to a round configuration, thus greatly facilitating welding operations. Pipes often present manufacturing defects which give rise to a section that is of oval shape, it being understood that the difference in diameter between the smallest diameter and the largest diameter of a given section is of the order of a few millimeters, or about 1 centimeter (cm) or more. The simplest clamping systems perform centering solely in the vicinity of the welding plane and are said to be "two-plane" centering systems, the two planes being on either side of the welding plane. These planes are substantially perpendicular to the axis of the pipe elements after welding. More sophisticated clamping systems have clamps disposed in four planes, i.e. two additional planes situated on opposite sides of the welding plane so as to improve the manner in which the two pipe elements are brought into alignment, and causing the clamp to be engaged in each of the pipe elements on either side of the welding plane. Such centering inserts are generally fitted in their central portion with an anvil, in particular as described in French patent application No. 99/15254, which anvil is applied against the inside face of the pipe facing the welding zone, and which has the function of maintaining the weld bath during welding.

Thus, a centering insert device seeks to hold the ends of two pipe elements that are to be joined together end to end firmly in such a manner that all degrees of freedom in translation and in rotation are blocked, so as to avoid any parasitic relative movements between the two faces to be welded together during the welding operations proper, this stage remaining the most difficult stage during installation of undersea pipes in deep and ultra-deep water, i.e. in depths in the range 1500 m or 2000 m, or indeed 3000 m to 4000 m, or more.

A centering insert device serves to become securely engaged in each of the two pipe elements to be joined together end to end and to provide maximum stiffness in the vicinity of the junction plane so as to minimize relative movements between the two faces to be welded together, particularly when automatic welding is implemented. Above all, a centering insert device serves mainly to minimize rotation about axes contained in the section plane of the pipe.

In prior embodiments such as those described in U.S. Pat. Nos. 3,937,382, 4,418,860, and GB 1 283 922, each of the planes of said two- or four-plane centering inserts comprises clamping systems of the type presenting a circular conforming effect, i.e. they tend to return pipes of small or medium thickness to a "round" shape while also performing their main purpose of centering.

More precisely, in the present description, the term "clamping system with a circular conforming effect" is used to mean a plurality of clamps in a common centering plane, each clamp comprising a thrust block and a thruster device such as an actuator actuating said thrust block, said thrust blocks being disposed substantially radially about said longitudinal axis of said pipe and co-operating in such a manner that by applying thrust to an inside wall of oval section, they can deform it so as to return it to a "round" shape, i.e. circularize it in order to obtain a circular section.

A clamping system necessarily includes a minimum of three thrusters, and preferably has four, six, eight, twelve or more thrusters, the higher the number of thrusters the better the circularizing. The number of thrusters is generally determined by the space available for installing them within the main body of the clamping system.

Clamping systems with a circular conforming effect in the prior art comprise in particular a first pair of opposite thrust blocks which come into contact with the opposite points that are the closest together of the oval section of an oval-section pipe and which continue to apply thrust, thereby deforming the pipe so as to circularize it until a second opposite pair of thrust blocks come into abutment against opposite points of the oval section wall that were initially furthest apart, such that all of the thrust blocks in a given section plane can be tightened and blocked against the wall.

Those clamp systems comprise a main longitudinal body supporting a plurality of clamps each comprising a respective thrust block that comes into abutment against the inside wall of the pipe, together with a thruster device, in general actuators, serving to actuate said thrust blocks and move them against said inside wall. The thrusters can move in guide housings provided in the main body. Said thrust blocks move in translation in respective radial directions relative to the longitudinal axis of the pipe and of said main body, i.e. in directions perpendicular to said longitudinal axis.

In order to achieve such engagement, the centering insert devices described in the prior art have at least four section planes, each containing circular conforming effect clamps.

In the present description, the term "centering plane" or "section plane" is used to mean a plane substantially perpendicular to the longitudinal axis of the pipe or of said main body, as appropriate.

The inventors have observed that the problem which arises during J-laying when using clamping systems with a circular conforming effect, is that the main body of the centering insert is subjected to very high levels of stress while the pipe elements are being brought into alignment, and that can cause said body to bend, which means that the structure of said main body needs to be overdimensioned in order to be able to deliver the desired stabilization service during the stage of welding together the ends of said pipe elements.

OBJECTS AND SUMMARY OF THE INVENTION

A problem posed by the present invention is thus to provide a novel centering insert device which performs the functions of holding and engaging in two pipe elements that are to be joined together by welding, as mentioned above, while nevertheless avoiding the drawbacks of centering inserts having clamps of the type providing a circular conforming effect, as mentioned above.

To do this, the present invention provides a centering insert device for centering two pipe elements for welding together end to end, the insert being suitable for being inserted inside said pipe elements in register with the ends of said pipe elements that are to be welded together, which ends are preferably centered at their junction plane, said centering insert device comprising a main body which extends longitudinally substantially along the axis of said pipe; said main body supporting a plurality of clamps each comprising a thrust block suitable for being actuated by a thruster device, preferably comprising an actuator, more preferably a pneumatic actuator;

said thrust blocks being capable of moving in translation in a radial direction relative to the longitudinal axis from a retracted position remote from the inside wall of said pipe to a position in which said thrust block comes into abutment against said pipe wall;

said thrust blocks being disposed in a plurality of centering planes corresponding to section planes, preferably at least four said section planes; and there being at least three of said thrust blocks and preferably at least four in each of said planes in a regular angular distribution about said longitudinal axis.

Preferably, said clamps comprise clamps having a circular conforming effect at least in a pair of central section planes.

The device of the invention comprises independent clamps disposed in at least one end section plane, preferably in at least one pair of end section planes, said clamps thus being suitable for being blocked against the inside wall of said pipe so as to freeze the shape of the pipe in its initial state at said end plane(s), i.e. in its state prior to said clamps being actuated to come into abutment against said wall without deforming it.

This results in particular in the device of the invention, once put into place and actuated, changing neither the axial angular misalignment of said two pipe elements, nor the oval section of the pipe outside the welding plane. The pipe of the invention is thus not deformed by said end planes being made round.

In the present description, the term "central section plane" or "pair of central section planes" means one or the first two section planes in which clamps are disposed going away from the middle section plane of said main body and/or away from the junction plane between the pipe ends to be welded together, said two central section planes preferably being disposed symmetrically on either side of said junction plane when the centering insert is in place inside the pipe elements that are to be joined together end to end.

Similarly, the term "end section plane(s)" means the last section plane(s) having clamps furthest away from said middle section plane of said main body and/or from said junction plane, and preferably disposed symmetrically on either side thereof.

Conventionally, said two end planes are spaced apart by a distance lying in the range two times to five times the inside diameter of the pipe elements that are to be joined together end to end.

Said section planes are preferably disposed along said longitudinal axis in such a manner as to be capable of being situated in positions that are symmetrical in pairs relative to said junction plane between the two pipe elements when the centering insert is in place inside the pipe.

The centering insert device of the invention makes it possible to stabilize the two pipe portions in optimum manner by conforming them circularly in the central zone and by blocking them in said two end planes without significantly changing any ovalization or transverse misalignment that results from axial angular misalignment between said two pipe elements, which misalignment may be of the order of ⅒th of a degree to 1° after the circular conforming effect clamps have come into action in said central plane. By freezing the shape of the system in the state in which the insert encounters each of the two pipe elements, stresses are not generated in the system comprising the centering insert and the pipe, i.e. in particular the amount of bending in said clamp is limited. When the clamps are locked, the internal bending stresses in the main body of said centering insert are minimal or even practically zero. Thus, during movements of the ship, the clamp presents the same level of stress in all directions for the same angular displacement of the pipe in suspension relative to the ship.

By proceeding as in the prior art, i.e. by attempting to realign the two pipe elements and to make them round in said end planes at the ends of the centering insert, very high levels of stress are introduced into the main body of said centering insert device, and as a result it needs to be considerably overdimensioned in order to obtain a result that is similar in terms of rigidity to the device of the invention. In contrast, the device of the invention thus makes it possible to hold together firmly, and preferably also to reshape in circular manner the zone in the join plane, and to maintain all of the rigidity of its main body for stabilizing the two pipe elements while minimizing the rigidity which, at the ends of said clamp, would be being used pointlessly to return the pipe to the round shape or back to the axis.

In a first embodiment which is suitable most particularly for pipes of small diameter, said independent clamps of the invention in at least one said end plane, and preferably in both said end planes, are clamps of the "wedge" type and comprise a thruster device having a ramp pressed on the outside wall of said main body, and said thrust blocks are constituted by a chock which is suitable for moving along the ramp and thus for moving towards said inside wall of the pipe.

In this first embodiment, said independent clamp comprises most particularly a thruster device comprising an actuator, preferably a pneumatic actuator, and a said inclined ramp having a slope that rises from the surface of the main body towards said inside wall of the pipe, said thrust block consisting in a chock of shape complementary to the ramp so as to present a slope having the same inclination, whereby said chock actuated by said actuator is suitable for moving by sliding along the ramp until it becomes blocked by clamping between said ramp and said inside wall of the pipe.

In such independent clamps of the invention referred to as "wedge" clamps, the direction in which the chock moves thus includes a radial component and a longitudinal component (the axis of said main body or substantially the axis of the pipe). Because the actuators are capable of moving independently of one another in the various wedge clamps, when the chocks meet a wall of oval section they are in positions that are different both in said longitudinal directions and in said radial direction.

The slope of the inclined ramp is selected in such a manner as to take account of the materials of said ramp and of said chock so that the friction generated is sufficient to prevent any movement of the chock once the assembly has been moved to the approach and then locked. Thus, for a ramp of treated steel associated with chocks likewise made of treated steel, a ramp having a slope of 10% to 40% should be selected, and preferably a slope in the range 20% to 30%.

In a second embodiment, which is particularly suitable for pipes of large diameter, said independent clamps of said end planes of the invention are of the type comprising radial actuators and thrust blocks suitable for moving radially in guide housings of said main body, said thruster devices being constituted by actuators, preferably mechanical screw or hydraulic actuators, placed radially, said thrust blocks being at the ends of moving rods of said actuators.

In the present invention, one of said end planes, and preferably both of said end planes, have independent clamps, either both of the wedge type or both of the radial actuator type. The device with independent wedge clamps is particularly suited for small diameter pipes, i.e. for pipes having a diameter in the range 8 inches (") to 12"–14", since the available inside space is very small. The device with independent clamps having radial actuators, whether they are mechanical or hydraulic, can be implemented more simply when there is enough space, i.e. in pipes of large diameter, i.e. of diameter greater than 12" to 14", and up to 40", or even more.

In an original embodiment in accordance with the invention, said clamps that have a circular conforming effect in a said one of said central section planes are constituted by a plurality of thrust blocks suitable for moving uniformly and radially, preferably in guide housings of said main body, and said thrust blocks in a given central section plane are actuated uniformly by a single actuator, preferably a pneumatic actuator, via a plurality of connecting rods, said actuator being placed inside said main body, and preferably being disposed longitudinally.

In the centering insert device of the invention, the thruster devices of said clamps comprise actuators, preferably provided with means for locking them in the extended position after said thrust block has been clamped against said inside wall.

More precisely, each actuator is provided with means for blocking said thruster in its extended position, it then being possible to release the pressure in said actuator while retaining said thruster in position clamped against said pipe. Said blocking means for said thruster may be constituted by a motor-driven screw means, for example said piston may be secured to a nut which co-operates with a motor-driven screw so as to move in translation and block said piston in the extended position by blocking the screw. Other blocking means are known to the person skilled in the art.

The present invention also provides a method of assembling and welding together two pipe elements with the help of a centering insert. According to the present invention, the method comprises the following steps:

1) bringing together the two ends of said pipe elements to be welded together;

2) positioning said centering insert device in a first pipe element;

3) advancing said centering insert device inside said first pipe element until said junction plane reaches the middle section plane of said centering insert;

4) where appropriate, actuating said clamps having a circular conforming effect in said central planes, and then blocking them after they have been clamped against said inside walls of said pipe elements; and 5) actuating said independent clamps of said end planes, and then blocking them after they have been clamped against said inside walls of said pipe elements.

BRIEF DESCRIPTION OF THE DRAWINGS

Other aspects, characteristics, and advantages of the present invention appear better on reading the following description given in non-limiting, illustrative manner and with reference to the accompanying drawings.

In the drawings:

FIG. 5 is a side view of two pipe elements during the approach stage, the elements presenting vertical axial offset and also angular offset;

FIG. 6 corresponds to FIG. 5 in which the lateral offset has been corrected, but the angular offset persists;

FIG. 7 is a section view of two pipe segments having a four-plane centering insert installed therein, the two center planes being of the circular conforming type as shown in FIG. 4 and the two end planes being of the type having independent wedges;

FIG. 8 is a view similar to FIG. 7, with the two end planes with independent wedges being mounted in the same direction.

MORE DETAILED DESCRIPTION

Figure 1:
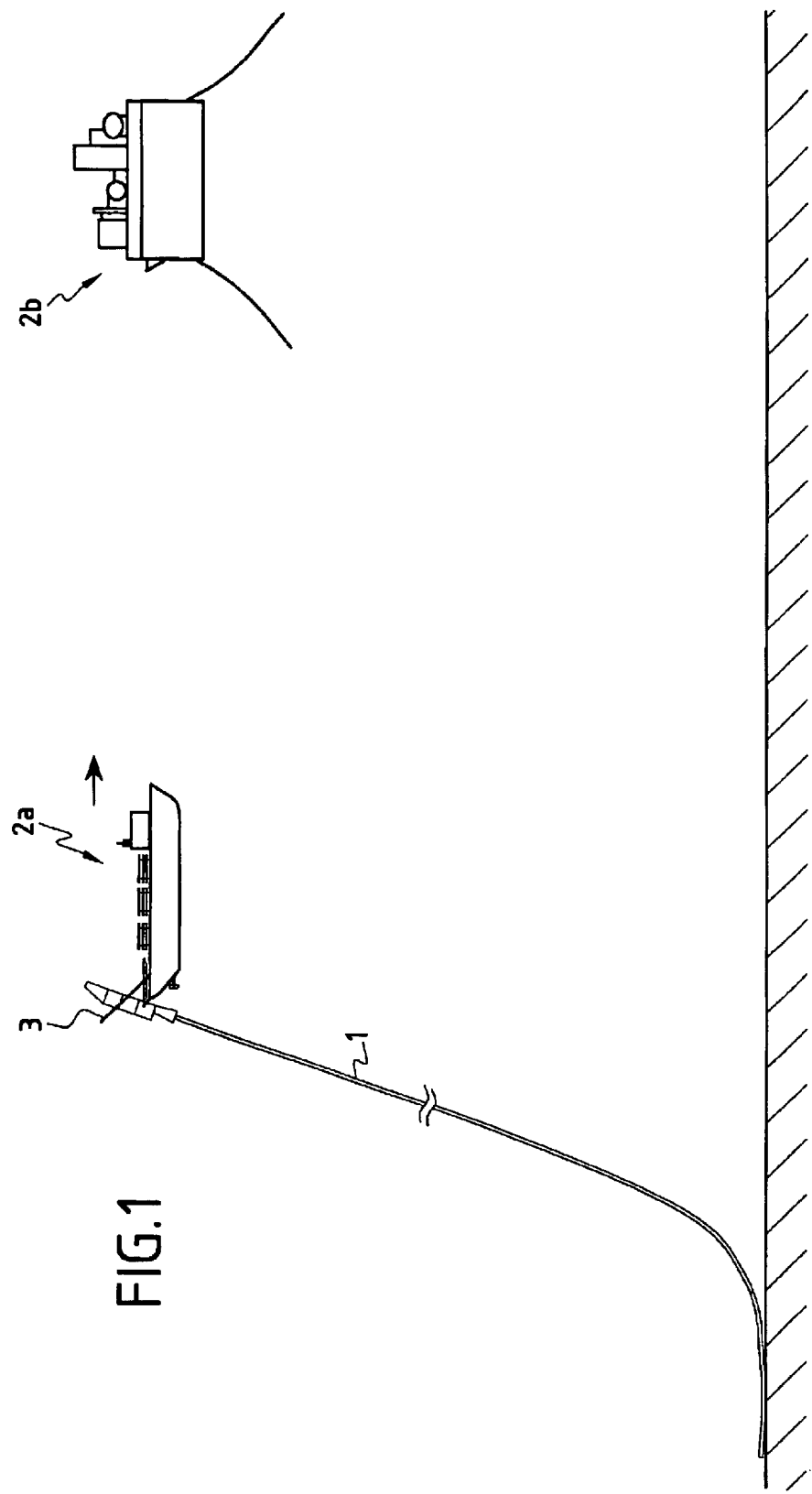
FIG. 1 is a diagrammatic side view of J-laying a pipe in great depth from a ship fitted with a laying tower 3 for laying undersea pipes.

FIG. 1 is a side view of a pipe 1 being J-laid in great depth from a ship 2a fitted with a tower 3 for laying undersea pipes, and heading towards a floating support 2b that is to receive said pipe. At the base of the tower, approximately level with the deck of the ship, welding operations are performed between the portion of the pipe 1 that has already been laid and a segment 5 that is generally 24 m or 48 m long, which segment is transferred while in the horizontal position along the deck to the laying axis of the tower by means of an articulated loading arm (not shown). Once the arm has been raised, the pipe 1 and the segment 5 are substantially in axial alignment, but they can be welded together only after they have been stabilized by means of a centering insert that enables them to be brought into alignment and to be held firmly in the zone of the welding plane.

The internal centering insert holds that assembly together throughout the assembly operation, and it is then withdrawn before the pipe is lowered ready to put the next segment into place.

The main body 4 may have wheels or skids disposed radially (not shown) to make it easier to insert and move inside the pipe prior to actuating the clamps. The wheels and/or skids are then disposed in a plurality of section planes ("rolling planes") lying between the centering planes or lying outside them, there being three, four, six, or eight such wheels or skids per rolling plane.

In FIGS. 2 to 9, said centering insert device 6 comprises a main body 4 which extends longitudinally substantially along the axis XX' of said pipe 1, 5.

Figure 2:
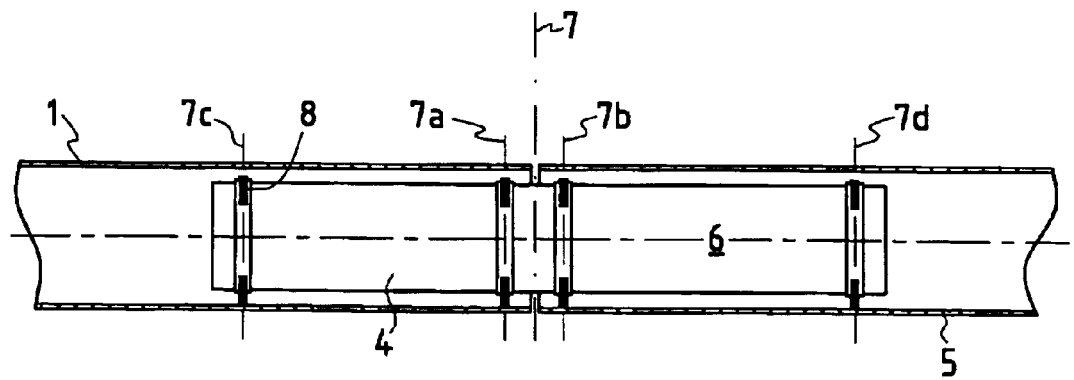
FIG. 2 is a longitudinal section view of two segments of pipe with a four-plane centering insert installed therein, said insert being shown in side view.
Figure 3:
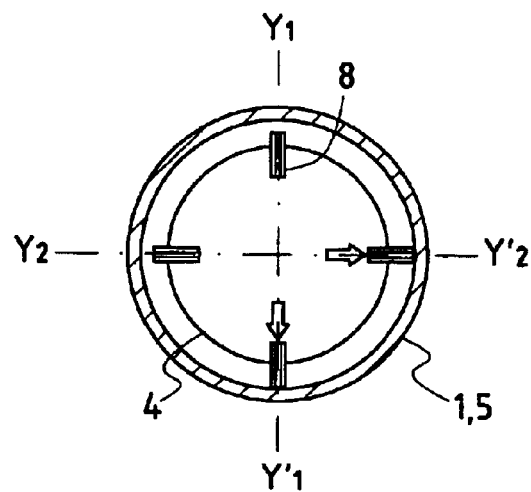
FIG. 3 is a section view of the pipe and the centering insert in a centering plane.
Figure 4:
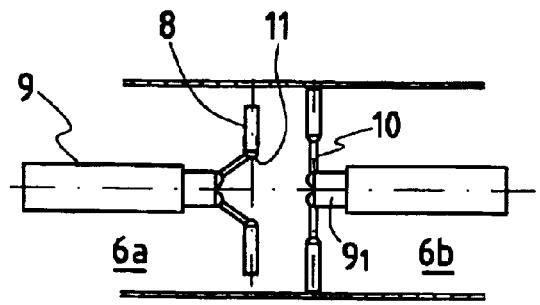
FIG. 4 is a side view of the centering insert device comprising clamps of the type having a circular conforming effect, constituted by an actuator, by thrusters, and by toggle joints.

FIGS. 2 and 3 show respectively a side view and a section view of a centering insert 6 having four centering planes, central planes 7a and 7b and end plates 7c and 7d, the clamps 6a and 6b being both of the circular conforming type as explained in FIG. 4. Said insert is installed inside pipe 1 that has already been laid and inside a segment 5 so as to cross the welding plane 7. Each of the planes 7a to 7d is provided with thrusters 8, there being at least three thrusters and generally four, six, or eight thrusters per plane, said thrusters being disposed radially $Y_1Y'_1$, $Y_2Y'_2$, relative to the longitudinal axis XX' of the centering insert 6 and/or of the pipe 1 and being actuated by a common actuator 9, in general a pneumatic actuator as shown in FIG. 4.

FIG. 4 shows how a clamp 6a–6b that acts as a circular conformer operates, said clamp comprising an actuator 9 actuating thrusters 8 via connecting rods 10 that are hinged to the rod 91 of the actuator, and to the thruster 8 at a point 11. The actuator 9 is shown in its retracted position on the left of the drawing, with the thrusters then being retracted away from the pipe 1. In the right-hand portion, the rod $9_1$ of the actuator has been extended to its extended position and by means of the connecting rods 10, the thrusters 8 have been advanced so as to come into abutment against said pipe 1. In order to clarify the drawing, the means for guiding said thrusters are not shown. Since the rod $9_1$ of the actuator acts simultaneously on all three, four, six, or eight connecting rods, it also acts simultaneously on all of the corresponding thrusters 8. Since the connecting rods 10 are all identical in length, and the thrusters 8 are also identical in length, when the toggle linkage constituted by each of the connecting rods is actuated, the pipe will be put back onto the axis of the centering insert. Providing the pipes are not too thick, the centering insert also acts as a circular conformer since it is then capable of making an ovalized pipe round.

FIGS. 5 and 6 show two pipe elements 1 and 5 ready to be assembled together by welding, and in FIG. 5 it can be seen that they are laterally offset in the welding plane, and also angularly offset by an angle α. In addition, the pipe 1 presents vertical ovalization 16, whereas the segment 5 presents horizontal ovalization 17.

In FIG. 6, a centering insert (not shown) has been installed in such a manner that the axes of the two pipe elements coincide in the welding plane 7. The centering insert is of the type having four planes, the two central planes 7a and 7b (not shown) being provided with clamps of the circular conforming type as described with reference to FIGS. 2, 3, and 4, while the end planes 7c–7d (not shown) are of the type having wedges in accordance with the invention and as shown in detail in FIG. 7. It should be observed in FIG. 6, that the two pipe elements are returned to a round shape 18 in the vicinity of the join plane 7, whereas they retain their respective ovalizations and also their angular offsets in the vicinity of the end planes because of the effect of the wedges as described below.

Figure 9:
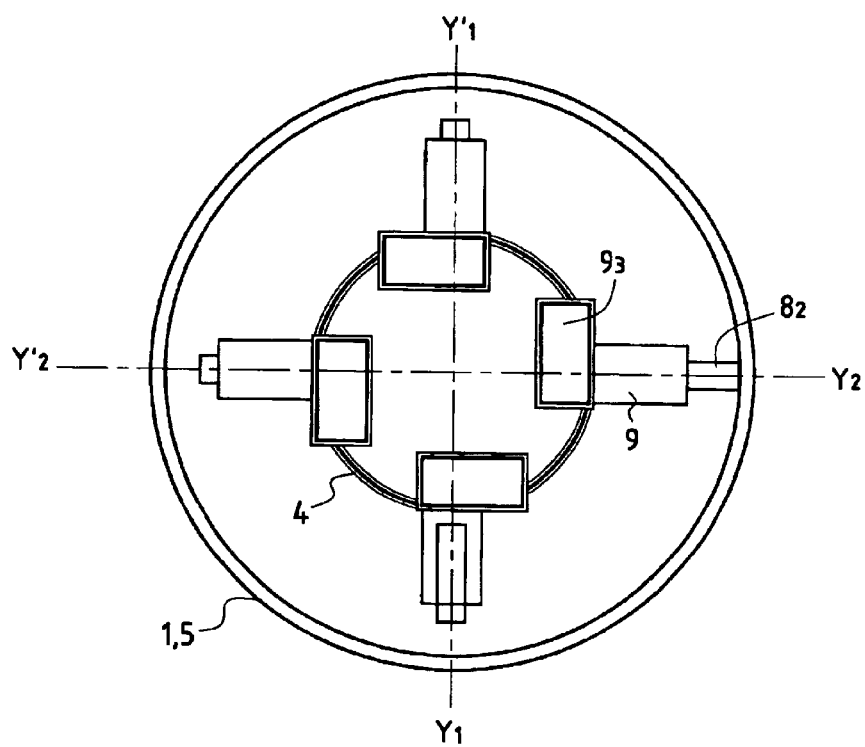
FIG. 9 is a section view of an end plane of a device having mechanical actuators controlled by independent electric motors.

In FIGS. 7 to 9, said main body 4 supports a plurality of clamps 6a–6b, $6_1$–$6_4$, each comprising a thrust block $8_1$, $8_2$ suitable for being actuated by a thruster device 9 comprising an actuator, preferably a pneumatic actuator; said thrust blocks $8_1$, $8_2$ are disposed in four centering planes 7a to 7d constituting section planes. At least three of said thrust blocks $8_1$, $8_2$ are provided in each of the planes, there preferably being at least four, six, eight, or more, and they are preferably regularly distributed angularly about said longitudinal axis XX'.

Said clamps comprise clamps providing a circular conforming effect 6a–6b in a pair of central section planes 7a and 7b, while the clamps $6_1$ and $6_4$ disposed in a pair of end planes 7c, 7d are clamps that are suitable for blocking themselves against the inside wall of said pipe without deforming it, thereby "freezing" the shape of the pipe in its initial state prior to the said clamps $6_1$–$6_4$ being moved into abutment against said wall.

Said clamps $6_1$–$6_4$ in said end planes 7c–7d are independent clamps, said thrust blocks $8_1$, $8_2$ of said independent clamps $6_1$–$6_4$ being suitable for moving in translation in said radial direction independently of one another and in non-uniform manner, the power of the thruster device being limited in such a manner that when the first thrust blocks $8_1a$, $8_2$ come into abutment against the inside wall of said pipe, they stop moving while the other thrust blocks $8_1b$ in the same end section plane 7c–7d which have not yet come into contact continue to move until they in turn come into abutment against said inside wall.

FIGS. 7 to 9 show a centering insert 6 fitted with two central planes 7a–7b having clamps of the circular conforming type, as described above, and two end planes 7c–7d having clamps of the independent wedge type.

In the embodiment of FIGS. 7 and 8, said end planes 7c–7d correspond to section planes of the main body in the middles of the chocks $8_1$ when the wedges or chocks $8_1$ are in their retracted position relative to the wall.

In FIGS. 7 to 9, said clamps 6a–6b having a circular conforming effect in the two central planes 7a–7b are constituted by a plurality of thrust blocks 8 suitable for moving uniformly and radially $Y_1Y'_1$–$Y_2Y'_2$, preferably in guide housings of said main body 4, and said thrust blocks 8 in a given central section plane 7a–7b are actuated uniformly by a common actuator 9, preferably a pneumatic actuator, via a plurality of connecting rods 10, said actuator 9 being placed inside said main body 4, preferably being disposed longitudinally XX'.

In FIGS. 7 and 8, each of said independent clamps $6_1$–$6_4$ of said two end planes comprises a thruster device 9–$9_1$–$9_2$ comprising an actuator 9, preferably a pneumatic actuator, and actuator rod $9_1$ and a ramp $9_2$ inclined with a slope that rises from the surface of the main body 4 towards said inside wall of the pipe element 1, 5, and said thrust block consists in a wedge or chock $8_1$ of shape complementary to the ramp $9_2$ so as to present a slope having the same inclination such that said chock $8_1$ actuated by said actuator 9 is suitable for sliding along the ramp $9_2$ until it becomes blocked by clamping between said ramp $9_2$ and said inside wall of the pipe element 1, 5, the slope of said ramp lying in the range 10% to 40%, and preferably in the range 20% to 30%.

The two pipe elements 1 and 5 are assembled together by the following steps:

1) holding the end of the pipe 1 in suspension;
2) presenting the second pipe element 5 close to the end of the pipe 1;
3) inserting the centering insert device 6 through the free end of the pipe element 5 and moving it inside until it reaches the junction plane 7;
4) adjusting the position of the centering insert in such a manner that its middle axis coincides with the junction plane 7, said plane being formed by the two ends $15_1$–$15_2$ of said pipe elements 1 and 5 to be welded together;
5) where appropriate, actuating said clamps that have a circular conforming effect 6a–6b in said central planes 7a–7b, by transmitting the high power of the actuators to the thrusters 8, in particular using a pressure of 20 bars to 40 bars, thereby pushing back the wall which is encountered first and deforming it until all of the thrusters in the same centering plane finally come into abutment against said wall, the wall thus being circularized, if that is possible given the thickness of the pipe. Said thrusters are then locked after clamping against said inside wall of the pipe elements 1 and 5, while maintaining pressure in the circuit; and
6) actuating said independent clamps $6_1$–$6_4$ in said end planes 7c–7d. To do this, the pressure in the actuators is relatively low, about 3 bars, since it is desired to avoid moving the wall. Thus, as soon as a chock $8_1a$ comes into contact with a wall, it stops moving. In contrast, the other chocks $8_1b$ continue to move. When all of the chocks $8_1$, $8_1a$, $8_1b$ are in abutment against the wall, they are blocked after being clamped against said inside walls of said pipe elements 1 and 5 by increasing pressure uniformly in all of the actuators until reaching a pressure of 20 bars to 40 bars, for example. In this position, pressure is maintained throughout the welding operation.

In FIGS. 7 to 8, each of the clamps $6_1$–$6_4$ with wedges $8_1$ is constituted by at least three, and preferably by four, six, eight, or twelve identical wedges $8_1$ moved by a respective actuator, preferably of the pneumatic actuator type, said actuator being connected to said wedge by a connecting rod 10 hinged to one of its ends 11. Under drive from the actuator 9, the wedge $8_1$ moves over the inclined plane $9_2$ until it comes into contact with the pipe. All of the actuators in a given plane are connected together and powered simultaneously. On the left of the drawing, the wedges $8_1$ are retracted away from the pipe. On the right, the actuators 9 have been actuated, and because the pipe is out of alignment by an angle α, the wedge $8_1a$ is the first to come into contact with the pipe and it remains in this position since the pressure in the circuit is low, and the other actuators continue to advance without encountering any obstacle. The wedges $8_1$ thus come into abutment in succession, with the wedge $8_1b$ being advanced much further forward than the wedge $8_1a$. Once all of the wedges $8_1$, $8_1a$, $8_1b$ have come into contact with the pipe 5, the pressure in the circuit can be increased simultaneously in all of the actuators 9, and the pipe 1, 5 is thus held firmly in this position without the pipe being circularly reshaped and without the centering insert being put onto the axis. Thus, the device of the invention gives the two pipe elements 1 and 5 a circular on-axis configuration in the welding plane. 7, and, at its ends, freezes the configuration of the two pipe elements in their existing state, i.e. without significantly modifying the ovalization of said pipes and without altering the angular misalignment.

FIG. 9 is a section view through an end plane 7c–7d having four mechanical screw actuators 9 controlled by respective electric motors $9_3$. The thruster $8_2$ is shown in its retracted position except on the right of the drawing where it is shown in contact with the pipe 1–5. The clamping sequence is performed in application of the following procedure:

all of the thrusters $8_2$ are in the retracted position;
all of the motors $9_3$ are powered simultaneously to deliver very low torque, for example by controlling said motors and delivering limited amperage;
as soon as one of the thrusters $8_2$ makes contact, its motor stops through lack of power, without significantly changing the shape of the pipe; and once all of the thrusters $8_2$ have made contact, each of the motors is controlled individually, e.g. to cause it to perform an additional half-turn. For this purpose, each motor is fed with the amperage needed, while monitoring its rotation, and the power supply is interrupted as soon as a half-turn has been performed. Diametrically-opposite motors are preferably actuated in pairs so as to conserve the overall shape as well as possible.

Since this type of motor is known to the person skilled in the art in the field of electrical servo-control, it is not described in detail herein.

In FIG. 9, said thrust blocks $8_2$ in said two end planes 7c–7d are suitable for moving radially in guide housings of said main body 4 independently of one another and in non-uniform manner, said thruster devices being constituted by mechanical screw actuators 9 disposed radially $Y_1Y'_1$, $Y_2Y'_2$, said thrust blocks $8_2$ constituting the ends of the moving rods of said actuators.

A similar result is obtained with hydraulic actuators being powered simultaneously at low pressure, e.g. 5 bars, until the thrusters make contact with the pipe. The actuators are then isolated from one another and some given volume of oil, e.g. 10 cm$^3$ is injected into each of them, preferably simultaneously in diametrically-opposite pairs so as to block the shape of the system. The actuators under pressure in this way are then isolated from the circuit throughout the welding procedure.

In a preferred version of the device with wedge-type clamps operated by independent pneumatic actuators, the chocks are advantageously moved by a single actuator, but each chock is connected thereto by a spring, preferably a gas spring, in such a manner that progress of the chock is limited as soon as it makes contact with the pipe 1, 5, and the pipe is not circularized in any way, nor is the axis of one pipe element restored relative to the other. In this configuration, the blocking effect is obtained by maintaining pressure in the single actuator, with internal friction at the chock associated with the ramp preventing any change in shape between the centering insert and either of the pipe elements 1, 5 throughout the duration of the welding cycle.

The device of the invention may be considered as being an "iso-force" device, in comparison with prior art circular conforming devices which are of the "iso-displacement" type.

The device of the invention is described in the context of lying pipe in great depths at sea, however it applies to any type of pipe, on land, or at sea, and for all types of industry, such as chemical, petrochemical, heating, and in general any industry that uses pipes for conveying fluids of any kind.

What is claimed is:

1. A centering insert device for centering two pipe elements for welding together end to end, the insert being suitable for being inserted inside said pipe elements in register with the ends of said pipe elements that are to be welded together, said centering insert device comprising a main body which extends longitudinally substantially along the axis of said pipe; said main body supporting a plurality of clamps each comprising a thrust block suitable for being actuated by a thruster device;

said thrust blocks being capable of moving in translation in a radial direction relative to the longitudinal axis from a retracted position remote from the inside wall of said pipe to a position in which said thrust block comes into abutment against said pipe wall;

said thrust blocks being disposed in a plurality of centering planes corresponding to section planes;

there being at least three of said thrust blocks in each of said planes in a regular angular distribution about said longitudinal axis;

the centering insert being characterized in that said clamps comprise independent clamps disposed in at least one end section plane, said thrust blocks of said independent clamps being suitable for moving in translation in said radial direction independently of one another and in non-uniform manner, the power of their respective thruster devices being limited so that when the first thrust blocks come into abutment against the inside wall of said pipe, they cease moving while the other thrust blocks in the same end section plane which are not yet in contact continue to move until they in turn come into abutment against said inside wall, said independent clamps of said end plane thus being suitable for being blocked against the inside wall of said pipe so as to freeze the shape of the pipe in its initial state at said end plane, without deforming the pipe.

2. A centering insert device according to claim 1, characterized in that each of said independent clamps in at least one said end plane comprises a thruster device comprising a ramp applied against the outside wall of said main body, and a thrust block constituted by a chock suitable for moving along the ramp and towards said inside wall of the pipe.

3. A centering insert device according to claim 2, characterized in that said independent clamp comprises a thruster device comprising an actuator, and a ramp inclined with a slope that rises from the surface of the main body towards said inside wall of the pipe, and said thrust block is constituted by a chock of shape complementary to that of the ramp in such a manner as to present a slope having the same inclination such that said chock actuated by said actuator is suitable for sliding along the ramp until it is blocked by being clamped between said ramp and said inside wall of the pipe.

4. A centering insert device according to claim 1, characterized in that said thrust blocks of at least one said end plane are suitable for moving radially in guide housings of said main body, said thruster devices being constituted by actuators, disposed radially, said thrust blocks being at the ends of the moving rods of said actuators.

5. A centering insert device according to any one of claims 1 to 4, characterized in that said clamps comprise clamps having a circular conforming effect in at least one pair of central section planes.

6. A centering insert device according to claim 5, characterized in that said clamps with a circular conforming effect in a given central plane are constituted by a plurality of thrust blocks, and said thrust blocks in a given central section plane are actuated uniformly by a common actuator, via a plurality of connecting rods.

7. A centering insert device according to claim 1, characterized in that the thruster devices of said clamps comprise actuators.

8. A device according to claim 1, characterized in that said thrust blocks are distributed over at least four of said section planes, comprising two said centering planes and at least two end section planes.

9. A device according to claim 1, characterized in that each of said section planes includes at least four said thrust blocks.

10. A method of assembling and welding together two pipe elements with the help of a centering insert device according to claim 1, the method being characterized in that it comprises the steps in which:

1) bringing together the two ends of said pipe elements to be welded together;

2) positioning said centering insert device in a first pipe element 3) advancing said centering insert device inside said first pipe element until said junction plane reaches the middle section plane of said centering insert;

4) where appropriate, actuating said clamps having a circular conforming effect in said central planes, and then blocking them after they have been clamped against said inside walls of said pipe elements; and 5) actuating said independent clamps of said end planes, and then blocking them after they have been clamped against said inside walls of said pipe elements.

11. A centering insert device according to claim 1, wherein the ends of said pipe elements that are to be welded together are centered at their junction plane.

12. A centering insert device according to any one of claims 1, 3 and 6, wherein said thruster device comprises an actuator.

13. A centering insert device according to claim 12, wherein said actuator is a pneumatic actuator.

14. A centering insert device according to claim 1, wherein said thrust blocks are disposed in at least four centering planes.

15. A centering insert device according to any one of claims 1 and 2, wherein said independent clamps are disposed in at least one pair of end planes.

16. A centering insert device according to claim 4, wherein said actuators are mechanical screw actuators or hydraulic actuators.

17. A centering insert device according to claim 6, wherein the said thrust blocks are suitable for moving uniformly and radially in guide housings of said main body.

18. A centering insert device according to clam 6, wherein said actuator is placed inside said main body and is disposed longitudinally.

19. A centering insert device according to claim 7, wherein said clamps comprising actuators are further provided with blocking means for blocking the clamps in an extended position after clamping the corresponding thrust blocks against said inside wall.

20. A centering insert device according to claim 9, wherein each of said section planes includes at least eight of said thrust blocks.

* * * * *